United States Patent
Ried et al.

(10) Patent No.: US 11,806,658 B2
(45) Date of Patent: Nov. 7, 2023

(54) METHOD FOR OPERATING A TEMPERATURE SWING ADSORPTION PLANT AND TEMPERATURE SWING ADSORPTION PLANT

(71) Applicant: Linde GmbH, Pullach (DE)

(72) Inventors: Thomas Ried, Munich (DE); Gabriel Salazar Duarte, Munich (DE)

(73) Assignee: Linde GmbH, Pullach (DE)

( * ) Notice: Subject to any disclaimer, the term of this patent is extended or adjusted under 35 U.S.C. 154(b) by 443 days.

(21) Appl. No.: 17/271,460

(22) PCT Filed: Aug. 20, 2019

(86) PCT No.: PCT/EP2019/025274
§ 371 (c)(1),
(2) Date: Feb. 25, 2021

(87) PCT Pub. No.: WO2020/048633
PCT Pub. Date: Mar. 12, 2020

(65) Prior Publication Data
US 2021/0308615 A1    Oct. 7, 2021

(30) Foreign Application Priority Data
Sep. 3, 2018   (DE) ..................... 10 2018 006 960.6

(51) Int. Cl.
*B01D 53/04*       (2006.01)

(52) U.S. Cl.
CPC ..... *B01D 53/0462* (2013.01); *B01D 53/0438* (2013.01); *B01D 2259/403* (2013.01); *B01D 2259/40088* (2013.01)

(58) Field of Classification Search
CPC   B01D 53/04; B01D 53/0462; B01D 53/0438; B01D 2259/40088; B01D 2259/403; B01D 2259/40007
(Continued)

(56) References Cited

U.S. PATENT DOCUMENTS

| 2003/0037672 A1 | 2/2003 | Sircar |
| 2005/0288512 A1* | 12/2005 | Butters .................. B01D 53/75 |
| | | 546/255 |

(Continued)

FOREIGN PATENT DOCUMENTS

WO    2017/220195 A1    12/2017

*Primary Examiner* — Frank M Lawrence, Jr.
(74) *Attorney, Agent, or Firm* — MILLEN WHITE ZELANO & BRANIGAN, PC; Brion P. Heaney

(57) ABSTRACT

A method for operating a temperature swing adsorption plant having three adsorption units which are operated in an adsorption phase, a feed phase, a regeneration phase, a flush phase, and a cooling phase, wherein in the adsorption phase a first gas mixture at a first temperature is guided over an adsorbent in the adsorption units with obtention of a second gas mixture and adsorption onto the adsorbent of components of the first gas mixture, in the regeneration phase the adsorption units are heated and the components adsorbed by the adsorbent during the adsorption mode are at least partially desorbed, and in the flush phase the components which were desorbed during the regeneration mode are at least partially flushed using a third gas mixture with obtention of a fourth gas mixture. In the cooling phase, the adsorption units are at least partially cooled to the first temperature.

15 Claims, 1 Drawing Sheet

(58) Field of Classification Search
USPC .... 95/106, 114, 115, 148; 96/108, 121, 126, 96/143–146
See application file for complete search history.

(56) References Cited

U.S. PATENT DOCUMENTS

| | | | |
|---|---|---|---|
| 2010/0058804 A1 | 3/2010 | Monereau | |
| 2010/0121126 A1* | 5/2010 | Northrop | B01D 53/04 48/128 |
| 2020/0306686 A1* | 10/2020 | Joss | B01D 53/0462 |
| 2021/0053008 A1* | 2/2021 | Ried | B01D 53/0462 |

* cited by examiner

METHOD FOR OPERATING A TEMPERATURE SWING ADSORPTION PLANT AND TEMPERATURE SWING ADSORPTION PLANT

The invention relates to a method for separating a gas mixture flow using temperature swing adsorption and to a temperature swing adsorption plant configured to carry out such a method in accordance with the respective preambles of the independent claims.

PRIOR ART

Temperature-change adsorption (temperature swing adsorption, TSA) is an adsorptive method for separating gas mixtures in which the adsorbent used is regenerated using thermal energy. Temperature-change adsorption is used, for example, for exhaust gas purification or for the preparation of gas mixtures, such as natural gas or synthesis gas. Other gas mixtures can also be separated in a corresponding manner using temperature-change adsorption, for example gas mixtures such as biogas or exhaust gases from chemical or physical gas scrubbing methods, such as rectisol or amine scrubbing, provided that they are suitable in their composition for a corresponding separation. The present invention is not limited to the use of certain adsorbents or gas mixtures.

Temperature-change adsorption makes use of the temperature dependence of adsorption processes. In these processes, an adsorbent which is accommodated in a suitable adsorber container (referred to herein as an "adsorption unit") is flowed through in an operating phase at a lower temperature level with the gas mixture flow to be separated and is thereby loaded with the respective component or components to be separated from the gas mixture flow. This operating phase is also referred to below as an "adsorption phase." In a subsequent operating phase, the adsorbent can then be largely freed of this or these components by heating, i.e., introducing thermal energy, and can be "regenerated" in this manner. This operating phase is also referred to below as a "regeneration phase." At least two adsorption units are therefore required for the continuous operation of a temperature swing adsorption plant so that one of the adsorption units can always be flowed through by the gas mixture flow to be separated and can thus be used for separating the gas mixture flow.

The temperature-change adsorption can be used in particular in substance systems having components which have high adsorption enthalpies. As a rule, the cycle times of the described operating phases are several hours. Temperature-change adsorption is generally used to remove low-concentration components in gas mixtures and is typically less suitable for removing higher-concentration components.

In traditional plants for temperature-change adsorption, a so-called "regeneration gas" in heated form is conducted in the regeneration phase directly over the adsorbent. In the process, the regeneration gas takes up the components that were previously adsorbed and now desorbed due to the temperature increase. The regeneration gas can be, for example, a purified process product, water vapor, or nitrogen. The use of other regeneration gases is also possible.

Alternatively to the use of a regeneration gas which comes into direct contact with the adsorbent, indirect heating of the adsorbent for its regeneration can also be carried out in the regeneration phase. For this purpose, a heated fluid flow can likewise be used, which is, however, guided through the adsorbent or an adsorber bed by means of heating lines, for example. A corresponding fluid is also referred to herein as "heat transfer fluid." In the terminology used herein, a heat transfer fluid is thus a liquid or a gas which is guided through a separate flow channel during indirect heating and/or cooling of an adsorber and is thus subjected to indirect heat exchange with the adsorbent. For example, water, thermal oil, vapor, or hot nitrogen can be used as heat transfer fluid in temperature swing adsorption plants.

After the regeneration phase, a corresponding adsorption unit is still filled with regeneration gas and a portion of desorbed components when a regeneration gas is used. With indirect heating, at least a portion of the desorbed components are likewise found in the adsorption unit. Consequently, a flush phase respectively follows in which the adsorption unit is flushed free with a so-called flushing gas. In this case, the respective content of the adsorption units is typically lost if no further measures are taken. After a corresponding flush phase, a cooling phase follows.

The object of the present invention is to avoid corresponding losses as far as possible when flushing an adsorption unit.

DISCLOSURE OF THE INVENTION

Against this background, the present invention proposes a method for separating a gas mixture flow using temperature swing adsorption and a temperature swing adsorption plant, configured to carry out such a method, with the features of the independent claims. Preferred embodiments are the subject-matter of the dependent claims and the following description.

Before explaining the features and advantages of the present invention, some of the principles and the terms used are discussed.

Component mixtures in the terminology used herein may be enriched with or depleted of one or more components, wherein these terms refer to a corresponding content in another component mixture, using which the component mixture under consideration was formed. According to the terminology used herein, a component mixture is "enriched" if it has at least 10 times, 100 times, or 1,000 times the content of the designated component(s), and is "depleted" if it has at most 0.1 times, 0.01 times, or 0.001 times the content of the designated component(s).

The present application uses the terms "pressure level" and "temperature level" to characterize pressures and temperatures, which means that corresponding pressures and temperatures in a corresponding plant do not have to be used in the form of exact pressure or temperature values in order to realize the inventive concept. However, such pressures and temperatures are typically in certain ranges whose maximum and minimum values differ by, for example, not more than 1%, 5%, 10%, 20%, or even 50%.

In this case, corresponding pressure levels and temperature levels can be in disjointed ranges or in ranges which overlap one another. In particular, pressure levels, for example, include unavoidable or expected pressure losses. The same applies to temperature levels.

ADVANTAGES OF THE INVENTION

In the context of the present invention, a method for operating a temperature swing adsorption plant with three adsorption units is proposed overall. The adsorption units are each at least partially filled with adsorbent, for example in the form of granules or molded bodies. In the following, reference is made in a simplified manner to "three" adsorption units, it being understood that more than three adsorption units can also be present or can be used in a plant according to the invention or a corresponding method, without this being explicitly specified.

The three adsorption units used in the context of the present invention are operated out of phase with respect to one another, respectively in an adsorption phase, then in a feed phase, then in a regeneration phase, then in a flush phase, and then in a cooling phase. In other words, the adsorption phase, the feed phase, the regeneration phase, the flush phase, and the cooling phase follow one another in the order indicated, wherein the specified phases are used only in the order indicated, but other operating phases can be interposed between these phases.

As is known in this respect in the temperature swing adsorption method, in the adsorption phase, a first gas mixture at a first temperature level is guided in each case over an adsorbent in the adsorption units and components of the first gas mixture are adsorbed by the adsorbent. In this case, a gas mixture (hereinafter referred to as the "second" gas mixture) is obtained which is depleted of the components adsorbing onto the adsorbent. The components adsorbing onto the adsorbent can be interfering components from a corresponding first gas mixture to be separated from product components, the second gas mixture representing a product mixture. However, they may also be such components which in turn are to be converted into a product mixture. It goes without saying that in the context of the present invention, all the components contained in the first gas mixture do not necessarily have to be adsorbed by the adsorbent. The adsorbed proportion thereof depends in particular on the respective adsorption properties and the adsorbent used, as well as on the prevailing further operating conditions.

In the regeneration phase, the adsorption units are heated (directly or indirectly as explained below) to a second temperature level above the first temperature level, and the components adsorbed by the adsorbent in the adsorption mode are at least partially desorbed therefrom. Here, too, it goes without saying that not all of the previously adsorbed components have to be desorbed again; however, as much desorption as possible is desirable in order to regenerate the adsorbent as completely as possible. The desorbed components can be guided out of the corresponding adsorption units during the entire regeneration phase or in a subsequent emptying phase. In all cases, however, a certain proportion of the desorbed components remains in the gas phase in the correspondingly regenerated adsorption units.

Therefore, in a flush phase following the regeneration phase, the (remaining) components desorbed in the regeneration phase and present in the adsorption units after the regeneration phase are at least partially flushed by means of a flushing gas (hereinafter referred to as the "third" gas mixture) to obtain a loaded flushing gas (hereinafter referred to as the "fourth" gas mixture). The fourth gas mixture is a fluid containing the desorbed components and the components of the third gas mixture. In particular if the desorbed components are the target products of a corresponding process, discarding the fourth gas mixture, as can be done conventionally, is disadvantageous.

In the cooling phase, the adsorption units are lastly cooled from the second temperature level or at least from a higher temperature level, in particular at least partially to the first temperature level. "At least partial" cooling means in particular cooling to the first temperature level or to a temperature level between the first and the second temperature level.

The present invention therefore proposes periodically repeating first operating periods respectively alternating with second operating periods. Further operating periods may also be interposed here. In the periodically repeated first operating periods, simultaneously, one of the adsorption units is operated in the adsorption phase, one of the adsorption units is operated in the flush phase, and one of the adsorption units is operated in the feed phase. It goes without saying that in the successive first operating periods, other adsorption units are respectively operated in the adsorption phase, in the flush phase, and in the feed phase, as explained in detail below.

According to the invention, it is furthermore provided that during the first operating periods, a portion of the second gas mixture is supplied to the adsorption unit operated in the flush phase as the third gas mixture or as part of the third gas mixture, and that the fourth gas mixture or a portion of the fourth gas mixture is supplied to the adsorption unit operated in the feed phase. The components contained in the third gas mixture and desorbed by the adsorbent in the regeneration phase can in this way be recovered in a particularly advantageous manner in the adsorption unit operated in the feed phase.

The special feature of the method proposed according to the invention consists of a recycling step, as just explained. As already explained, in this recycling step, a portion of the second gas mixture is used as, or as part of, the third gas mixture for flushing the adsorption unit to respectively be flushed after the regeneration phase, and the exiting gas stream, the fourth gas mixture, is supplied back to adsorption, namely in the adsorption unit operated in the feed phase. The gas exiting from the flushed adsorption unit, i.e., the fourth gas mixture, contains a higher concentration of the components to be respectively separated (or has a higher partial pressure of these components). In this way, the adsorbent load can be increased. In the context of the present invention, the adsorbent can be better utilized by precisely this process control, and a majority of the product used for flushing can be recovered. The amount of gas drawn off for flushing can be compensated almost completely in this way.

In the context of the present invention, lower product flow fluctuations can furthermore be achieved than in conventional methods with three adsorption units without a corresponding recycling. Overall, in particular the yield of the respective target component can be significantly increased in the context of the present invention.

For example, a blower may be used to compensate for the pressure drop over the adsorbers correspondingly operated in the feed phase or the other phases mentioned.

In order to clarify the operation of the adsorption units operated in the feed phase, it can be noted that, in this case, the fourth gas mixture is guided at least partially at the first temperature level over an adsorbent in the adsorption units, wherein components of the fourth gas mixture are adsorbed by the adsorbent. A fifth gas mixture obtained in so doing is at least partially fed to the second gas mixture. The fifth gas mixture in this case is depleted of the components being adsorbed by the adsorbent, wherein this enrichment in the fifth gas mixture is increased in comparison with the fourth gas mixture due to the higher partial pressure.

In the context of the present invention, simultaneously, one of the adsorption units is operated in the adsorption phase, one of the adsorption units is operated in the regeneration phase, and one of the adsorption units is operated in the cooling phase in the mentioned second operating periods which alternate with the first operating periods explained above. The first and second operating periods explained above are explained in more detail below, in particular with reference to FIGS. 1 and 2.

A portion of the second gas mixture obtained in the adsorption phase can also be used for cooling in the second operating periods. For this purpose, this portion can be introduced into a corresponding adsorption unit. In this way, the pressure can be maintained in a corresponding adsorption unit. Without this measure, the pressure could drop which could have a negative effect on the performance in the subsequent adsorption step.

As already mentioned, the adsorption unit respectively operated in said phases alternate in the first phase with each instance. In the context of the present invention, during the first operating periods, the adsorption unit that was operated in the flush phase in an earlier first operating period is respectively operated in the adsorption phase, the adsorption unit that was operated in the adsorption phase in the earlier first operating mode is respectively operated in the feed phase, and the adsorption unit that was operated in the feed phase in the earlier first operating period is respectively operated in the flush phase. An "earlier" first operating period in this case denotes the respectively prior first operating period, wherein there is no further first operating period between this earlier first operating period and the respectively considered first operating period.

Furthermore, in the context of the present invention, during the second operating periods, the adsorption unit that was operated in the cooling phase in an earlier second operating period is respectively operated in the adsorption phase, the adsorption unit that was operated in the adsorption phase in the earlier second operating period is respectively operated in the regeneration phase, the adsorption unit that was operated in the regeneration phase in the earlier second operating period is respectively operated in the cooling phase. What was mentioned above with respect to the "earlier" first operating periods applies to the "earlier" second operating periods.

In the context of the present invention, direct heating can take place in the regeneration phase by guiding a fluid through the adsorption unit operated in the regeneration phase, which fluid comes into material contact with the adsorbent in the adsorption unit. Corresponding desorbing components can be conducted away directly by means of a corresponding fluid.

In the context of the present invention, however, an indirect temperature control can also be used in the regeneration phase, i.e., the energy is supplied or removed via a thermal fluid which does not come into contact with the adsorbent in the adsorption unit but is separated therefrom by an impermeable barrier. In a correspondingly indirectly heated regeneration phase, only the gas being released is conducted away by the desorption and by the volume expansion so that the pressure in a corresponding adsorption unit remains substantially constant. Particularly in such a case, flushing is required due to the relatively high contents of desorbed components after a corresponding adsorption phase. This proves to be particularly effective in the context of the present invention. It is also possible to carry out electrical heating instead of or in addition to the explained types of heating.

In the context of the present invention, the regeneration phase can also be divided, and a gas mixture taken from the adsorption unit operated in the regeneration phase can be partially supplied to the adsorption unit operated in the feed phase. This can be the case in particular if the predominant proportion of these components has already been desorbed and a corresponding residual gas no longer has an effectively usable proportion of these components.

As already explained, in the context of the present invention, the second gas mixture can be taken from the plant as a product gas mixture, or the components at least partially adsorbed in the regeneration phase can be converted into a corresponding product gas mixture. In other words, in the context of the present invention, the respective target component can thus be the less adsorbing component but also the more adsorbing component which is again found in this way in the product or in the residual gas.

In the context of the present invention, the third gas mixture may be preheated before it is used in the flush phase. In this way, the regeneration can be further enhanced.

Furthermore, it is also possible in the context of the present invention to at least partially cool the fourth gas mixture or the portion thereof that is supplied to the adsorption unit operated in the feed phase. In this way, the adsorption onto the adsorbent used in the feed phase can be improved by the temperature reduction.

It is also possible to at least intermittently and at least partially temporarily store the third gas mixture and use it only then in the manner explained. A corresponding buffer tank, which can be used for the temporary storage of the third gas mixture and thus of the residual gas, can also be operated in pressure change mode so that an increased storage capacity results. In this way, a so-called "residual gas void" can be filled by the discontinuous residual gas accumulation.

In the context of the present invention, the first temperature level, that is to say the temperature level of the adsorption, can in principle be 15 to 50° C. The second temperature level can be, for example, 100 to 300° C. The operating pressures used depend in particular on the respective field of application. They are typically between 10 and 100 bar absolute pressure.

The present invention also extends to a temperature swing adsorption plant, which may in particular be configured for operation according to a method as previously explained in embodiments. With respect to features of a corresponding temperature swing adsorption plant, reference is expressly made to the corresponding independent claim as well as the above explanations. The same also applies to the advantages achievable by means of a corresponding temperature swing adsorption plant.

The present invention is explained again below with reference to the accompanying Table 1, in which successive operating periods and the respective operating phase of the adsorption units are illustrated.

TABLE 1

| Operating period | 1.1 | 2.1 | 1.2 | 2.1 | 1.3 | 2.3 |
|---|---|---|---|---|---|---|
| Adsorption unit 1 | A | A | Z | R | S | K |
| Adsorption unit 2 | Z | R | S | K | A | A |
| Adsorption unit 3 | S | K | A | A | Z | R |

In Table 1, the operating periods 1.1, 1.2, and 1.3 indicated in the header denote three instances of the previously explained first operating periods, while the operating periods 2.1, 2.2, and 2.3 contrastingly denote three instances of the respectively previously explained second operating periods. The adsorption units used are numbered 1 to 3.

In Table 1, A denotes an adsorption phase, Z denotes a feed phase, R denotes a regeneration phase, S denotes a flush phase, and K denotes a cooling phase. For further details regarding these phases, reference is made to the above explanations as well as to the explanations relating to FIGS. 1 and 2 in which the adsorption units and the operating periods or phases have identical numbers.

The invention is explained below with reference to the accompanying drawings which illustrate embodiments of the present invention in the form of schematic process diagrams.

In the figures, elements corresponding to one another and method steps corresponding to one another are respectively indicated by identical reference signs and are not explained repeatedly for the sake of clarity.

DETAILED DESCRIPTION OF THE DRAWINGS

Figure 1:
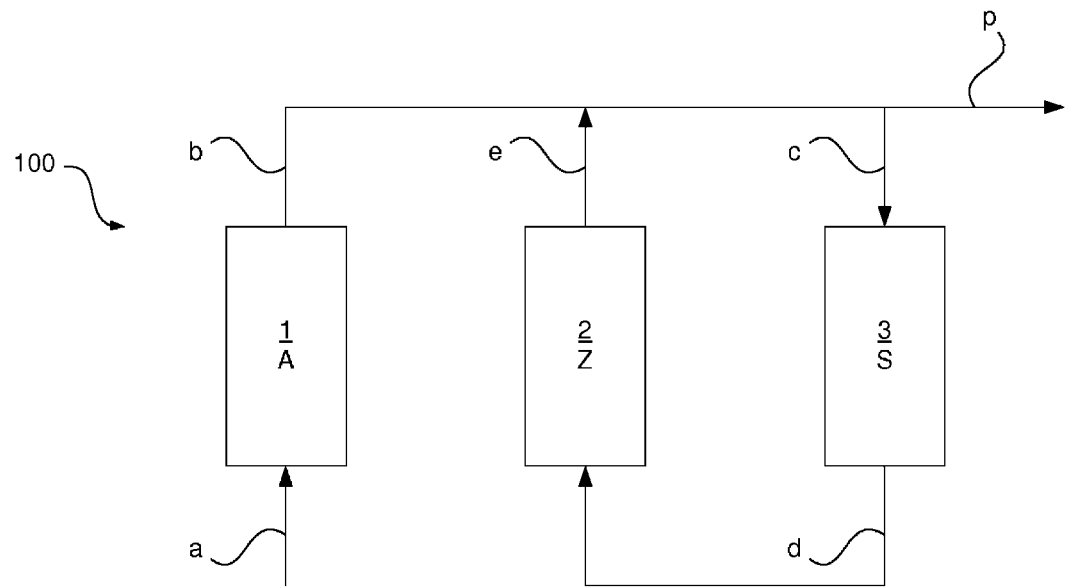
FIG. 1 illustrates a process according to an embodiment of the invention in the form of a simplified process diagram.

FIG. 1 illustrates a method according to an embodiment of the present invention in the form of a simplified process diagram. At the same time, FIG. 1 shows a corresponding plant which is denoted as a whole by 100.

In the method and plant 100 illustrated in FIG. 1, three adsorption units 1, 2, 3 are provided and used accordingly. FIG. 1 illustrates an instance of a first operating period (see also 1.1 in Table 1), as explained in detail above. In the example shown, the three adsorption units are operated in an adsorption phase (A, adsorption unit 1), in a feed phase (Z, adsorption unit 2), and in a flush phase (S, adsorption unit 3). In subsequent first operating periods, continuous switching occurs as illustrated in Table 1.

In this case, a first gas mixture "a" at a first temperature level is supplied to the adsorption unit 1 in the adsorption phase A. A second gas mixture "b" is obtained, wherein components of the first gas mixture "a" adsorb onto an adsorbent in the adsorption unit 1. The second gas mixture "b" can be used to provide a product mixture "p".

The adsorption unit 2 is in the feed phase Z, the adsorption unit 3 is in the flush phase S. In the flush phase S, components previously desorbed in an unillustrated regeneration phase (R, see FIG. 2) and present in the adsorption unit 1 after the regeneration phase are at least partially flushed by means of a third gas mixture, denoted here by "c," while obtaining a fourth gas mixture, denoted here by "d." In the embodiment of the present invention illustrated here, a portion of the second gas mixture "b" is supplied to the adsorption unit 3 operated in the flush phase S as part of the third gas mixture "c."

In the embodiment of the invention illustrated here, the fourth gas mixture "d" is supplied to the adsorption unit 2 operated in the feed phase Z, wherein each of the adsorbable components adsorb here as well. A fifth gas mixture "e" is obtained, which is at least partially combined with the second gas mixture "b" in the shown example.

Figure 2:
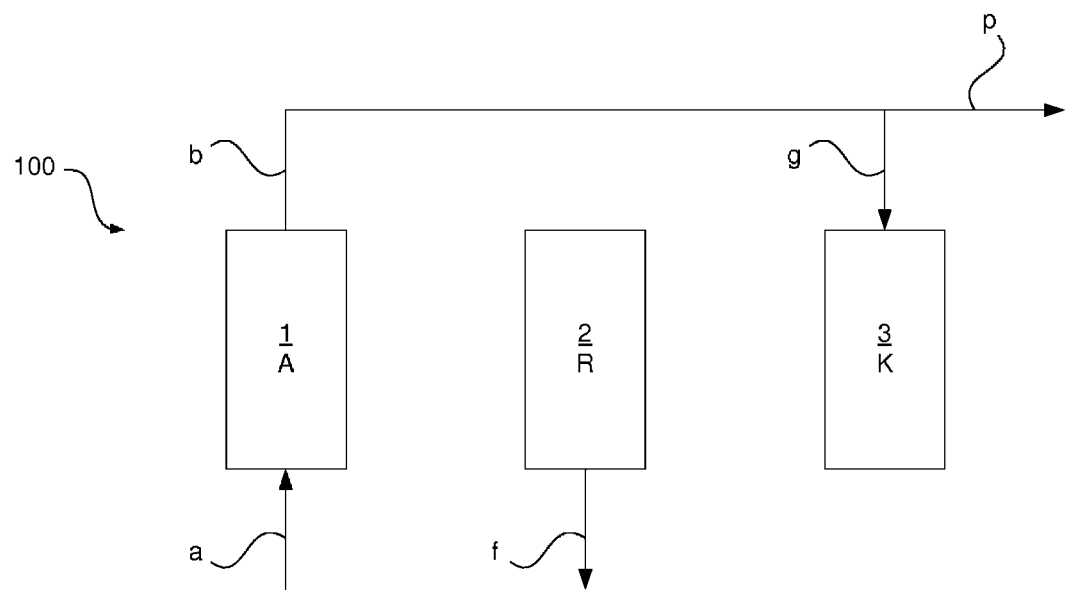
FIG. 2 illustrates a process according to an embodiment of the invention in the form of a simplified process diagram.

FIG. 2 illustrates one instance of the operating period previously mentioned several times and referred to as the "second" operating period (see also 2.1 in Table 1). In this operating period, the first adsorption unit 1 is in the adsorption phase A, the second adsorption unit 2 is in a regeneration phase R, and the third adsorption unit 3 is in a cooling phase K.

The adsorption phase A of the first adsorption unit has already been explained. In the regeneration phase R of the second adsorption unit 2, the latter, or its adsorbent, is heated by means of a suitable heating fluid or electrically, directly or indirectly as explained above. In this way, a gas flow "f" is obtained, which can be conducted out of the second adsorption unit 2. If a flow through the corresponding adsorption unit 2 is carried out in material contact with the adsorbent, a corresponding gas flow "f" is continuously conducted out in this case in a comparatively large volume; with indirect heating, a pressure increase resulting from the temperature expansion and the release of gas during desorption is simply compensated.

A portion of the second gas mixture "b," denoted here by "g," is introduced into the third adsorption unit 3 so that, as mentioned, a pressure can be maintained in this adsorption unit 3 in this way.

The invention claimed is:

1. A method for operating a temperature swing adsorption plant (100) having three adsorption units (1, 2, 3), which are operated out of phase with respect to one another, respectively in an adsorption phase, then in a feed phase, then in a regeneration phase, then in a flush phase, and then in a cooling phase, wherein, in the adsorption phase, a first gas mixture at a first temperature level is guided over an adsorbent in the adsorption units (1, 2, 3) with obtention of a second gas mixture, and components of the first gas mixture are adsorbed by the adsorbent, in the regeneration phase, the adsorption units (1, 2, 3) are heated to a second temperature level above the first temperature level, and the components adsorbed onto the adsorbent in the adsorption phase are partially or completely desorbed, in the flush phase, the components desorbed in the regeneration phase and present in the adsorption units (1, 2, 3) after the regeneration phase are flushed partially or completely by means of a third gas mixture with obtention of a fourth gas mixture, and in the cooling phase, the adsorption units (1, 2, 3) are at least partially cooled to the first temperature level, wherein, in repeated first operating periods which alternate with second operating periods, simultaneously, one of the adsorption units (1, 2, 3) is operated in the adsorption phase, one of the adsorption units (1, 2, 3) is operated in the flush phase, and one of the adsorption units (1, 2, 3) is operated in the feed phase, and during the first operating periods, a portion of the second gas mixture is supplied to the adsorption unit (3) operated in the flush phase as the third gas mixture or as part of the third gas mixture, and the fourth gas mixture or a portion of the fourth gas mixture is supplied to the adsorption unit (1, 2, 3) operated in the feed phase.

2. The method according to claim 1, wherein in the adsorption units (1, 2, 3) operated in the feed phase, the fourth gas mixture is guided partially or completely at the first temperature level over an adsorbent in the adsorption units (1, 2, 3), wherein components of the fourth gas mixture are adsorbed by the adsorbent, and a fifth gas mixture obtained in so doing is fed partially or completely to the second gas mixture.

3. The method according to claim 1, wherein during the second operating periods, simultaneously, one of the adsorption units (1, 2, 3) is operated in the adsorption phase, one of the adsorption units (1, 2, 3) is operated in the regeneration phase, and one of the adsorption units (1, 2, 3) is operated in the cooling phase.

4. The method according to claim 3, wherein the adsorption unit (3) operated in the cooling phase in the second operating periods is respectively partially or completely supplied with the second gas mixture.

5. The method according to claim 1, wherein in the first operating periods,
the adsorption unit (1) that was operated in the flush phase in an earlier first operating period is respectively operated in the adsorption phase,
the adsorption unit (2) that was operated in the adsorption phase in the earlier first operating period is respectively operated in the feed phase, and
the adsorption unit (3) that was operated in the feed phase in the earlier first operating period is respectively operated in the flush phase.

6. The method according to claim 3, wherein in the second operating periods,
the adsorption unit (1) that was operated in the cooling phase in an earlier second operating period is respectively operated in the adsorption phase,
the adsorption unit (2) that was operated in the adsorption phase in the earlier first operating period is respectively operated in the regeneration phase, and
the adsorption unit (3) that was operated in the regeneration phase in the earlier first operating period is respectively operated in the cooling phase.

7. The method according to claim 1, wherein a fluid is guided through the adsorption unit (1-3) operated in the regeneration phase and comes into material contact with the adsorbent in the adsorption unit (1-3).

8. The method according to claim 1, wherein a heating fluid is guided through the adsorption unit (1-3) operated in the regeneration phase and is separated from the adsorbent in the adsorption unit (1-3) by an impermeable barrier, and/or wherein the adsorption unit (1-3) operated in the regeneration phase is electrically heated.

9. The method according to claim 1, wherein the regeneration phase is divided, and a gas mixture taken from the adsorption unit (1-3) operated in the regeneration phase is partially supplied to the adsorption unit (1-3) operated in the feed phase.

10. The method according to claim 1, wherein the second gas mixture is taken from the plant (100) as a product gas mixture, or wherein the components at least partially desorbed in the regeneration phase are transferred into a product gas mixture.

11. The method according to claim 1, wherein the third gas mixture is preheated before it is used in the flush phase.

12. The method according to claim 1, wherein the fourth gas mixture, or the portion thereof that is supplied to the adsorption unit (1, 2, 3) operated in the feed phase, is cooled.

13. The method according to claim 1, wherein the fourth gas mixture is partially or completely stored temporarily.

14. The method according to claim 1, wherein the first temperature level is 15 to 50° C., and wherein the second temperature level is 100 to 300° C., wherein the method is carried out in particular at a pressure level of 10 to 100 bar.

15. A temperature swing adsorption plant (100) with three adsorption units (1, 2, 3), which is configured to operate the adsorption units (1, 2, 3) out of phase with respect to one another, respectively in an adsorption phase, then in a feed phase, then in a regeneration phase, then in a flush phase, and then in a cooling phase, wherein the temperature swing adsorption plant (100) is furthermore configured,
in the adsorption phase, to guide a first gas mixture at a first temperature level over an adsorbent in the adsorption units (1, 2, 3) with obtention of a second gas mixture, and to absorb components of the first gas mixture by the adsorbent,
in the regeneration phase, to heat the adsorption units (1, 2, 3) to a second temperature level above the first temperature level, and to partially or completely desorb the components adsorbed by the adsorbent in the adsorption mode,
in the flush phase, to partially or completely flush the components desorbed in the regeneration mode and present in the adsorption units (1, 2, 3) after the regeneration phase by means of a third gas mixture with obtention of a fourth gas mixture, and
in the cooling phase, to at least partially cool the adsorption units (1, 2, 3) to the first temperature level, wherein the temperature swing absorption plant is further configured,
in repeated first operating periods that alternate with second operating periods, to respectively simultaneously operate one of the adsorption units (1, 2, 3) in the adsorption phase, one of the adsorption units (1, 2, 3) in the flush phase, and one of the adsorption units (1, 2, 3) in the feed phase, and
during the first operating periods, to supply a portion of the second gas mixture to the adsorption unit (3) operated in the flush phase as the third gas mixture or as part of the third gas mixture, and to partially or completely supply the fourth gas mixture to the adsorption unit (1, 2, 3) operated in the feed phase.

* * * * *